April 25, 1950 — P. D. ZOTTU — 2,505,025

HIGH-FREQUENCY TREATING SYSTEM

Filed June 1, 1945

INVENTOR.

PAUL D. ZOTTU

BY

Virgil E. Woodcock

ATTORNEY

Patented Apr. 25, 1950 2,505,025

UNITED STATES PATENT OFFICE 2,505,025

HIGH-FREQUENCY TREATING SYSTEM

Paul D. Zottu, Indian Hills, Ky., assignor to The Girdler Corporation, Louisville, Ky., a corporation of Delaware Application June 1, 1945, Serial No. 597,047

4 Claims. (Cl. 219—47)

Figures 1, 2:
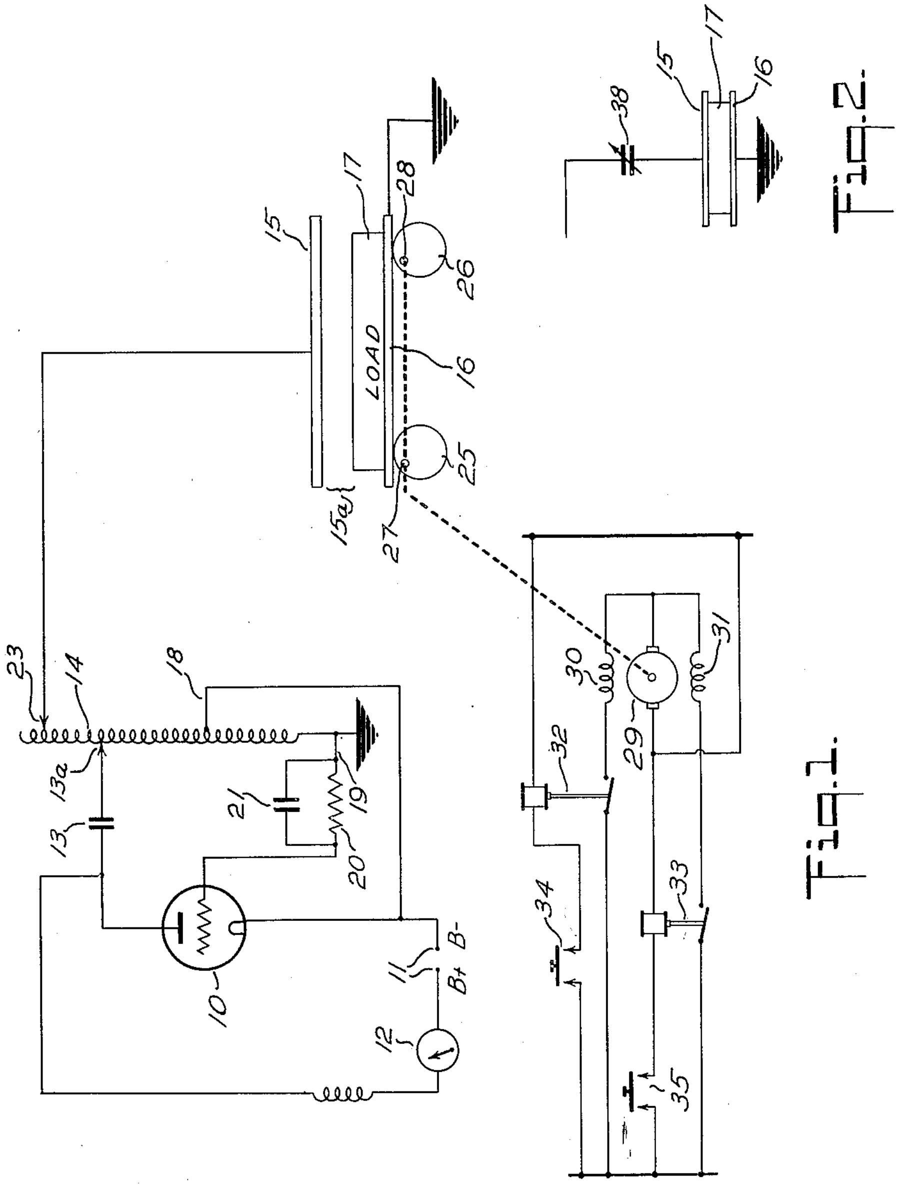

This invention relates to high-frequency treating systems for dielectric materials and has for an object the provision of means for and a method of controlling the load or the amount of electrical power or energy applied to the dielectric material undergoing treatment.

It has heretofore been recognized that dielectric materials change their characteristics with increasing temperature. For many materials the dielectric properties change, specifically the dielectric constant and the resistance. In general, they increase as the temperature rises. It has heretofore been suggested that tuning coils be included in the load circuit to maintain it at a frequency resonant with the frequency from the high-frequency generator. The adjustment of the tuning coil would be in a direction to compensate for the change in the capacitance due to the rising temperature of the dielectric material. The disadvantage with systems of this type is that such an adjustment does not compensate for both variables. While a small adjustment of the tuning coil may compensate for one, it does not compensate for the other. Specifically, while the change in the resonant frequency may be corrected, the adjustment does not take care of the change in the effective resistance of the load.

In carrying out the present invention in one form thereof, there is provided a high-frequency generator or oscillator having an output circuit which forms the tank circuit of the oscillator. The material comprising the dielectric load is disposed between electrodes in the output circuit and usually provides the main capacitance for the tank circuit. The grid circuit of the oscillator is energized directly from the tank circuit. The inductance and the capacity of the output tank circuit are selected so that the desired generated frequency will be obtained for the initial heating of the dielectric material. If during the rise of temperature of that material the resonant frequency of the output circuit changes, it will be understood that the frequency of the energy applied to the grid circuit will likewise change. Since the grid circuit is energized from the output circuit, it always receives the desired excitation. There is provided a single control means which is effective to control the load of the oscillator. The single control means will be effective since in a self-excited oscillator of the type to which the invention has been applied, a change in the capacity between the electrodes produces a change in the frequency generated by the oscillator. The load, or the amount of electrical energy absorbed by the dielectric material, is then controlled by varying the spacing, the capacitance, between the two electrodes associated with the material undergoing treatment. The electrodes are relatively adjustable and the spacing between them is so varied as to maintain the input to the dielectric material at a desired predetermined value. Stated differently, the electrodes are so adjusted as to maintain substantially constant the impedance between the anode and ground of the oscillator.

For a more complete understanding of the invention and for further objects and advantages thereof, reference should now be had to the following description taken in conjunction with the accompanying drawing in which:

Fig. 1 schematically illustrates a system embodying the invention; and

Fig. 2 is a fractional view of a modified form of the invention.

Referring to the drawing, a high-frequency treating system has been shown as comprising electric valve means 10 in which an input circuit is connected to a suitable source 11 for the anode, an ammeter 12 being included in the circuit. The output circuit includes a blocking capacitor 13, an inductor or output coil 14 and the two electrodes 15 and 16 disposed in heating relation to a dielectric load 17. The grid circuit is energized directly from the inductor 14 by means of the connection 18 leading to the cathode of the valve means 10 and by the connection 19 leading to the grid by way of a grid resistor 20 and a shunting capacitor 21 which form a grid-biasing means.

It will be readily understood by those skilled in the art that the output circuit including the inductor 14 and the electrodes 15 and 16 comprise a tank circuit which has a resonant frequency determined by the inductance of the inductor 14 and the capacitance between the electrodes 15 and 16 plus the reactances introduced by the valve means 10 and other associated apparatus. Thus, with the cathode of the valve means 10 suitably heated, electrical oscillations will be produced corresponding closely to the frequency at which said tank circuit is resonant.

In practice, the inductor 14 is provided with an inductance which, in conjunction with the capacitance between electrodes 15 and 16 plus other associated capacities, provides a circuit which will be resonant at any desired operating frequency. It may be well below or above the range of from 1 megacycle to 30 megacycles per second.

The amount of electrical energy or power delivered to the load 17 will depend upon the impedance of the load and upon the voltage applied to it. The loading of the generator or oscillator may be increased by moving the variable tap 23 in a direction, upwardly as shown in Fig. 1, to increase the voltage applied to the load 17. Though the resonant frequency of the output circuit will be changed by the resulting increase in inductance, there is no change in excitation due to the shift in frequency because the grid circuit 18—19 is energized directly from the output tank circuit. The generated frequency will always correspond with the frequency at which the load circuit with its associated circuit elements is resonant. Conversely, to decrease the load or the energy consumed by the dielectric material 17, the variable tap 23 may be moved in a direction to decrease the applied voltage.

The output coil or inductor 14 may also be considered as an auto-transformer with input terminals corresponding with the tap 13*a* and conductor 18 and with output terminals corresponding with tap 23 and ground. The effect of varying the spacing between the electrodes 15 and 16 is to change the effective impedance between the tap 13*a* and ground. With a circuit of the kind disclosed, it is to be understood that this impedance may be adjusted and maintained relatively constant by varying the position of the tap 13*a* on the coil or inductor 14, or by varying either the position of the tap 23, or by varying the spacing between the electrodes 15 and 16. In each form of the invention, the adjustment is made in a direction to maintain the aforesaid impedance constant, the effect of which is to maintain substantially constant at a predetermined value the output from the oscillator or generator valve means 10.

More particularly, if it be assumed that the load 17 is of a dielectric material having a resistance or power factor which increases with rising temperature, the impedance between terminal 13*a* and ground will be maintained relatively constant by decreasing the capacitance to compensate for the increase in the resistance. From the voltage standpoint, the air space 15*a*, between the load and the electrode 15, may be considered as a first capacitor, while the load 17 may be considered a second capacitor. Thus the voltage across the load 17 will vary inversely with respect to the relative capacitances of the two capacitors. If the dielectric constant of the load 17 changes, then the spacing 15*a* may be changed to compensate therefor and to maintain substantially constant the energy delivered to the load. From the standpoint of the generator or oscillator, the change in the capacitance of the air gap 15*a* between electrodes 15 and 16 is reflected into the anode circuit and corrects for the change in the impedance between anode or tap 13*a* and ground which resulted from the change in the dielectric constants of the load 17.

In the illustrated form of my invention it will be observed that the load 17 is supported directly on the plate electrode 16. The plate electrode 16 rests upon cams 25 and 26 carried by shafts 27 and 28, which are driven by a reversible motor 29. In order to vary the air gap 15*a*, the motor 29 may be energized by means of field winding 30 to decrease the air gap and by means of field winding 31 to increase the air gap 15*a*. Accordingly, by providing relays of motor-controlling contactors 32 and 33, under the control of relays or push-buttons 34 and 35, the motor 29 may be energized in accordance with the anode or plate current as indicated by the ammeter 12. It will be understood the electrodes 15 and 16 may be of any desired shape, such for example as rectangular, and that there will be provided two or more cams on the shafts 27 and 28 respectively corresponding with the cams 25 and 26.

In normal operation, the load 17 will be inserted between the electrodes 15 and 16 and the source of anode supply B+ and B— will then be connected to the electric valve means 10. Upon closure of the push-button 34, the motor 29 will be energized in a direction to decrease the air gap 15*a*. This will increase the voltage applied to the load 17; it will increase the electrical load upon the oscillator. When the anode current rises to a value corresponding with that value which represents the normal load on the valve means 10, the push-button 34 will be released to de-energize the relay or contactor 32. Should the anode current, as indicated by the ammeter 12, continue to increase, which it will do if the resistance of the load 17 increases with temperature, it is only necessary to depress the push-button 35 to close the contactor 33 for operation of the motor 29 in the reverse direction to lower the load 17 and thus increase the air gap 15*a*. This decreases the capacitance and thus compensates for the rise in resistance. In this manner, the load may be maintained at a relatively constant value, or if desired, it may be adjusted in accordance with a predetermined time cycle selected in accordance with the character of heating desired.

In the foregoing description, the air gap 15*a* has been likened to a separate capacitor. This air gap 15*a* not only serves that purpose, but in some applications of the invention it also serves the additional function of preventing burning of the material 17 due to possible arcing between the electrodes. An air gap is also useful in achieving greater uniformity of heating where a plurality of objects, such as preforms of plastic material for molding, are of slightly different height. Should the electrode 15 contact some of the preforms disposed on the electrode 16, they would be heated at a higher rate than other preforms of slightly shorter length. Thus, by maintaining a small air gap between all preforms, more uniform heating of all of them may be achieved. One the other hand, it is sometimes desirable to have both electrodes 15 and 16 in contact with the load. For example, where the load 17 is to be subjected to pressure, the electrodes are usually directly in contact with the work or load. In such cases, as shown in Fig. 2, the electrodes 15 and 16 are placed directly against the work while the tank circuit has included therein a variable capacitor 38. This capacitor is provided with means for varying the capacitance thereof, preferably by operation of the motor 29. The other features of the system as described in connection with Fig. 1, may be utilized with the modification of Fig. 2.

While preferred embodiments of the invention have been described, it is to be understood that other modifications may be made, and, therefore, I intend in the appended claims to set forth the true spirit and scope of the invention.

What is claimed is:

1. In the art of dielectric heating, the method which comprises disposing the dielectric between spaced plates to form therewith the capacitance of the grid-anode tank circuit of a self-excited oscillator, and during heating of the dielectric by the high-frequency field between said plates detecting changes in the oscillator load and varying the spacing of the plates to maintain a predetermined oscillator load and a predetermined rate of heating in compensation for the electrical changes of the dielectric and regardless of effect upon the oscillator frequency.

2. In a dielectric heating system in which dielectric to be treated is disposed between electrodes to form therewith the capacitance of an oscillator tank circuit, the method which comprises applying the high-frequency voltage of the tank circuit to said dielectric in treatment thereof, during treatment of the dielectric detecting changes of the oscillator load due to changes in electrical characteristics of the dielectric, during said treatment varying the spacing of said electrodes in compensation for the detected electrical changes of the dielectric to maintain a predetermined rate of heating at new frequencies determined by the new spacings between the electrodes, and applying as the grid-excitation of the oscillator a constant fraction of said high-frequency voltage.

3. In a system of dielectric heating of the type wherein dielectric material to be treated is disposed between electrodes to form therewith the frequency-determining capacitance of the grid-anode tank circuit of a high-frequency generator, the method which comprises applying high-frequency energy to said material at a rate which imposes a substantial load upon said generator, and during treatment of the dielectric material detecting changes in the oscillator load and varying the spacing of said electrodes to change said capacitance and the frequency of said generator in sense compensating for load changes produced by treatment of said material by said high-frequency energy so to maintain substantially constant said loading of the generator.

4. A high-frequency dielectric heating system comprising a self-excited electric oscillator for generating high-frequency electrical energy, said oscillator including valve means having a power supply input circuit and a combined output and grid-anode tank circuit, a pair of electrodes disposed in spaced heating relation to a dielectric load to form a capacitor, and circuit connections for connecting said capacitor in said grid-anode tank circuit of said oscillator, said load during heating imposing an inherently varying load demand upon said oscillator, structure for supporting one of said electrodes for movement relative to the other of said electrodes for varying the capacitance of said grid-anode tank circuit by the change of spacing between said electrodes during heating of said load, reversible driving means for said structure, direction-controlling means for controlling said driving means for selective movement of said structure in one direction or the other to change the spacing and capacitance between said electrodes during heating of said dielectric load, a measuring device included in said power supply anode circuit responsive to flow of current therein for detecting changes in the oscillator load, and means for selectively controlling said direction-controlling means for movement of one electrode toward and away from the other electrode simultaneously to vary the high-frequency voltage applied to said load and the high-frequency voltage applied to said grid circuit whereby the current in said anode circuit to which said measuring device is responsive may be maintained substantially constant with changes in the electrical characteristics of the load disposed between said electrodes.

PAUL D. ZOTTU.

REFERENCES CITED

The following references are of record in the file of this patent:

UNITED STATES PATENTS

| Number | Name | Date |
|---|---|---|
| 1,882,684 | Achard | Oct. 18, 1932 |
| 1,900,573 | McArthur | Mar. 7, 1933 |
| 1,998,332 | Page | Apr. 16, 1935 |
| 2,112,418 | Hart et al. | Mar. 29, 1938 |
| 2,179,261 | Keller | Nov. 7, 1939 |
| 2,231,457 | Stephen | Feb. 11, 1941 |
| 2,339,607 | Smith | Jan. 18, 1944 |
| 2,342,846 | Crandell | Feb. 29, 1944 |
| 2,396,004 | Gilbert | Mar. 5, 1946 |